US008126965B2

(12) United States Patent
Hu et al.

(10) Patent No.: US 8,126,965 B2
(45) Date of Patent: Feb. 28, 2012

(54) PAPER BASED MEETING SERVICE MANAGEMENT TOOL

(75) Inventors: Chang Hu, College Park, MD (US); Qiong Liu, Milpitas, CA (US); Xuemin Liu, Sunnyvale, CA (US); Paul P. McEvoy, San Francisco, CA (US); Chunyuan Liao, Greenbelt, MD (US)

(73) Assignee: Fuji Xerox Co., Ltd., Tokyo (JP)

( * ) Notice: Subject to any disclaimer, the term of this patent is extended or adjusted under 35 U.S.C. 154(b) by 665 days.

(21) Appl. No.: 11/712,025

(22) Filed: Feb. 28, 2007

(65) Prior Publication Data

US 2008/0203175 A1 Aug. 28, 2008

(51) Int. Cl.
*G06F 15/16* (2006.01)
*G06K 9/60* (2006.01)
*G06K 9/18* (2006.01)
*G06K 19/06* (2006.01)
*G06K 7/10* (2006.01)

(52) U.S. Cl. ........ 709/204; 382/306; 382/186; 235/494; 235/454

(58) Field of Classification Search .......... 709/204
See application file for complete search history.

(56) References Cited

U.S. PATENT DOCUMENTS

| 7,245,483 | B2 * | 7/2007 | Feague et al. ............. 361/679.3 |
| 7,502,509 | B2 * | 3/2009 | Sheets et al. ............. 382/186 |
| 7,532,366 | B1 * | 5/2009 | Yang et al. ............. 358/3.28 |
| 2005/0052700 | A1 * | 3/2005 | Mackenzie et al. ......... 358/1.18 |
| 2005/0289453 | A1 * | 12/2005 | Segal et al. ............. 715/512 |
| 2006/0242560 | A1 * | 10/2006 | Wang et al. ............. 715/513 |
| 2007/0025645 | A1 * | 2/2007 | Slatter ............. 382/313 |
| 2008/0152224 | A1 * | 6/2008 | MacKenzie ............. 382/187 |
| 2008/0273797 | A1 * | 11/2008 | Takikawa et al. ............. 382/188 |

OTHER PUBLICATIONS

Anoto, Inc., Anoto Functionality, http://www.anotofunctionality.com/cldoc/aof3.htm.
Chiu, P., et al., "Notelook: Taking Notes in Meetings with Digital Video and Ink," *Proceedings of ACM Multimedia '99*, pp. 149-158.
Chiu, P., et al., "Automatically Linking Multimedia Meeting Documents by Image Matching," *Proceedings of Hypertext 2000*, pp. 244-245.
PARC, "DataGlyphs®: Embedding Digital Data," http://www.parc.com/research/projects/dataglyphs/.
Davis, R., et al., "NotePals: Lightweight Note Sharing by the Group, for the Group," *Proceedings of the SIGCHI Conference on Human Factors in Computing Systems: the CHI is the Limit,*, May 15-20, 1999, pp. 338-345.
Denoue, L., et al., "Shared Text Input for Note Taking on Handheld Devices," *CHI '02 Extended Abstracts*, pp. 794-795.

(Continued)

*Primary Examiner* — Jeffrey Pwu
*Assistant Examiner* — Shaq Taha
(74) *Attorney, Agent, or Firm* — Morgan, Lewis & Bockius LLP (57) ABSTRACT

The present invention provides a paper-based meeting service management tool for meeting support functions. The paper-based tool includes a digital pen that can be used to make strokes which can be transmitted from the digital pen to services that provide the meeting support functions. The paper-based tool also includes digital paper that has an underlying image pattern. The digital pen can locate itself on the digital paper by recognizing underlying dot patterns and transmitting the location information to a computer through a Bluetooth connection.

25 Claims, 10 Drawing Sheets
(8 of 10 Drawing Sheet(s) Filed in Color)

OTHER PUBLICATIONS

Hecht, D., "Printed Embedded Data Graphical User Interfaces," *IEEE Computer*, 34, 3, 47-55, Mar. 2001.

Logitech, Inc., "Logitech® io™ 2 Digital Writing System," http://www.logitech.com/index.cfm/products/features/digitalwriting/US/EN,crid=1545.

Microsoft, Microsoft PressPass, "Digital Ink, Breakthrough Technology in Tablet PC, Brings the Power of the Pen to the Desktop," http://www.microsoft.com/presspass/features/2002/oct02/10-29tabletinking.mspx.

Moran, T., et al., "Design and Technology for Collaborage: Collaborative Collages of Information on Physical Walls," *Proc. UIST '99*, pp. 197-206.

Moran, T., et al., "Implicit Structures for Pen-Based Systems Within a Freeform Interaction Paradigm," *Proceedings of CHI '95*, pp. 1-10.

Nelson, L, et al., "Palette: A Paper Interface for Giving Presentations," *Proceedings of the SIGCHI Conference on Human Factors in Computing Systems (CHI '99)*, ACM Press, May 1999, pp. 354-361.

Rubine, D., "Specifying Gestures by Example," Computer Graphics, vol. 25, No. 4, Jul. 1991, pp. 329-337.

Saund, E., et al., "Stylus Input and Editing Without Prior Selection of Mode," *Proceedings of the 16th Annual ACM Symposium on User Interface Software and Technology*, Nov. 2-5, 2003.

Stifelman, L., et al., "The Audio Notebook: Paper and Pen Interaction with Structured Speech," *Proceedings of the SIGCHI Conference on Human Factors in Computing Systems*, CHI 2001, vol. 3, No. 1, Mar. 31-Apr. 4, 2001, pp. 182-189.

Truong, K.N., et al., "StuPad: Integrating Student Notes with Class Lectures," CHI '99, Extended Abstracts, May 15-20, 1999, pp. 208-209.

Wilcox, L., et al., "Dynomite: a Dynamically Organized Ink and Audio Notebook," *Proceedings of the SIGCHI Conference on Human Factors in Computing Systems*, Mar. 22-27, 1997, pp. 186-193.

Wolf, C., et al., "Communication and Information Retrieval with a Pen-based Meeting Support Tool," *Proceedings of the 1992 ACM Conference on Computer-Supported Cooperative Work*, CSCW '92, Nov. 1-4, 1992, pp. 322-329.

* cited by examiner

PAPER BASED MEETING SERVICE MANAGEMENT TOOL

BACKGROUND OF THE INVENTION

1. Field of the Invention

This invention is related to meeting support integration systems as well as digital pen and paper systems.

2. Description of the Related Art

Today's fast-developing technology is posing a challenge for meeting support systems. On the one hand, more and more tools are incorporated into meetings. The devices used in a normal meeting may include pens, paper pages, projectors, TVs, VHS/DVD players, clocks, printers, light switches, white boards, smart boards, laptops, tablets, PDAs, presentation controllers, reference books, calculators, cameras, pointers, laser pointers, remote controls or even cell phones. On the other hand, it is hard for a meeting participant to learn and recall so many meeting support functions. It is also cumbersome to switch from one support function to another.

There have been multiple attempts to deal with this problem in the past by developing integrated support systems for meeting support, but none of the integrated meeting support systems have solved the problem. Some attempted solutions have used tablet PC, laptop, or desktop PC for providing a meeting support interface, but it was expensive to deploy and hard to carry for daily meetings. Moreover, some meeting participants are reluctant to install control interface on their PCs because of security concerns.

Pen-based meeting support systems date back to the early 1990's, however devices bearing an active writable display (such as tablet PCs and PDAs) can be expensive to deploy. Moreover, those devices can be too large for the users to pass around, hindering users from sharing sketches and notes on them.

As the most historic and convenient media, paper has long been integrated into meetings and offices. There have been a number of research projects that try to link paper with digital devices. One project could control slideshows with barcodes on paper. Another project provided note-taking and paper-guided audio replaying. However, in terms of conference support, those systems are aiming at multimedia meeting minutes provided to participants after the meeting, rather than multimedia control during the meeting.

SUMMARY OF THE INVENTION

The present invention has been made in view of the above circumstances and provides a digital pen and paper tool for meeting support functions. With this paper-based tool, meeting participants can control meeting support devices on the same paper on which they take notes. Additionally, a meeting participant can also share paper drawings on a selected public display or initiate a collaborative discussion on a selected public display with a page of paper.

The digital paper has an underlying image pattern. The digital pen can locate itself on the paper by recognizing the underlying dot patterns and transmitting the location information to a computer through a Bluetooth connection. The location and time-stamped moving path of the pen is then mapped to commands corresponding to certain meeting services. Furthermore, the digital pen has a pressure activated switching function for mode transition between pointer mode and visible stroke mode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Preferred embodiments of the present invention will be described in detail based on the following figures, wherein.

DETAILED DESCRIPTION OF THE INVENTION

As more and more tools are developed for meeting support tasks, properly using these tools to get expected results becomes too complicated for many meeting participants. To address this problem, embodiments of the invention facilitate the initiation of various services with a digital pen and paper-based interface. With this paper-based tool, meeting participants can control meeting support devices on the same paper on which they take notes. Additionally, a meeting participant can also share paper drawings on a selected public display or initiate a collaborative discussion on a selected public display with a page of paper. Compared with traditional interfaces, such as tablet PC or PDA-based interfaces, the interface of this paper-based tool with a digital pen has much higher resolution and is much cheaper and easier to deploy.

The paper-based interface has an underlying image pattern and three functional portions. These three functional portions are: freeform drawing pad, meeting space adaptation portion, and user adaptation portion. The digital pen can locate itself on the paper by recognizing the underlying dot patterns and transmit the location information to a computer through a Bluetooth connection. The location and time-stamped moving path of the pen is then mapped to commands corresponding to certain meeting services.

This paper-based tool is intended for use in corporate meeting rooms with a variety of heterogeneous meeting support devices. A presenter can start and control meeting support devices, including controlling presentation progress with a piece of paper and the digital pen. A meeting participant can start a white board on any public display to make scribbles. Users point or write at any place on their digital paper to share screens for group discussions. They can also initiate an onsite screen printout with a digital pen and paper.

Embodiments of the invention use a digital pen and digital paper to control the meeting support systems. The digital pen and paper supports buttons, controls based on time-stamped drawings, scribbling, and Dynamic Buttons, a new type of interaction that a user can draw and define on the paper. In order to control the meeting support systems, pen strokes made by the user are interpreted into commands. The interpretation is accomplished by services that provide meeting support functions. These services can include whiteboard sketching, pointing, presentation control, printer use and control, screen switching and handwriting recognition.

A paper interface is created from digital paper with an underlying image pattern and three functional portions. These three functional portions are: freeform drawing pad, meeting space adaptation portion, and user adaptation portion. The digital pen can locate itself on the paper by recognizing the underlying dot patterns and transmit the location information to a computer through a Bluetooth connection (or alternative communication capability). The location and time-stamped moving path of the pen is then mapped to commands corresponding to certain meeting services.

Figure 1A:
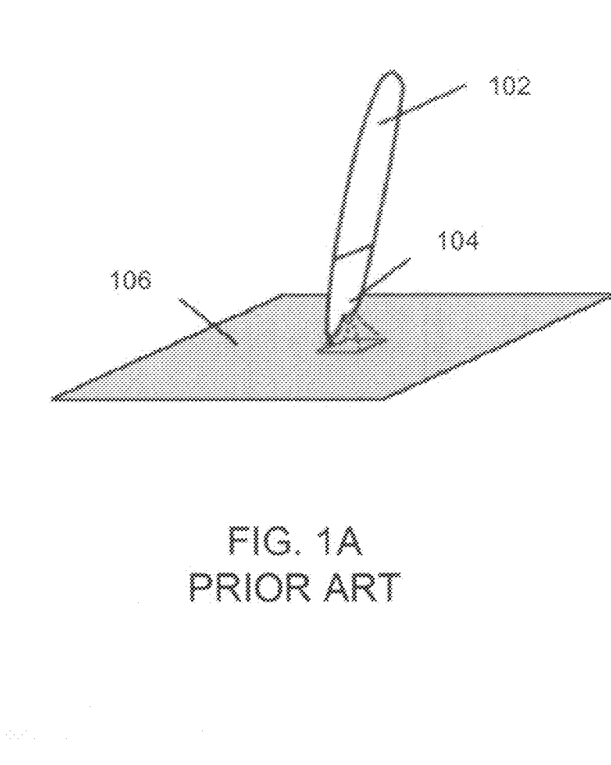
FIG. 1A shows a related art digital pen using its camera to read its location upon a piece of digital paper.
Figure 1B:
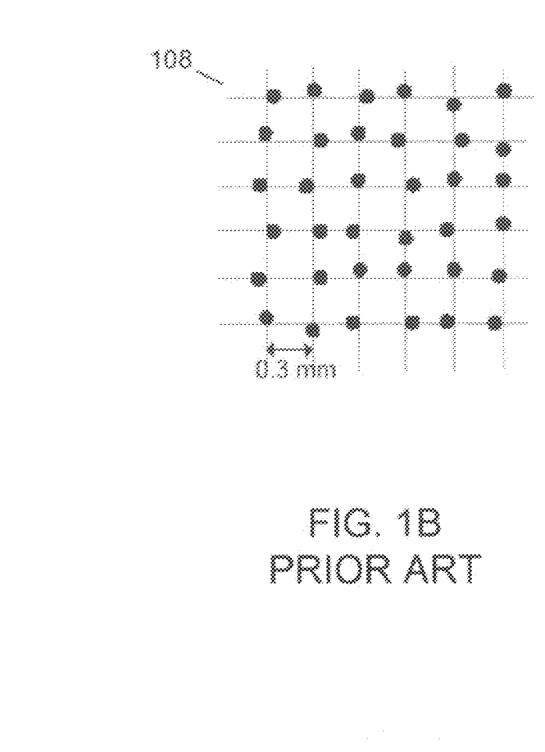
FIG. 1B shows the irregular positioning of the dots on a piece of related art digital paper which allows the digital pen to determine its exact location upon a piece of digital paper.

FIG. 1A shows a related art digital pen 102 locating itself on the paper 106 through the pen's digital camera 104. Although the pattern printed on the related art digital paper is too small to be seen, FIG. 1B shows what the pattern 108 would look like if you could see it. The digital pen 102 uses ink and can be used just like a normal ballpoint pen, but it also contains a digital camera 104, an advanced image processing system (for reading the pattern printed on the paper), and a wireless Bluetooth connection (or alternative communication capability).

Figure 2:
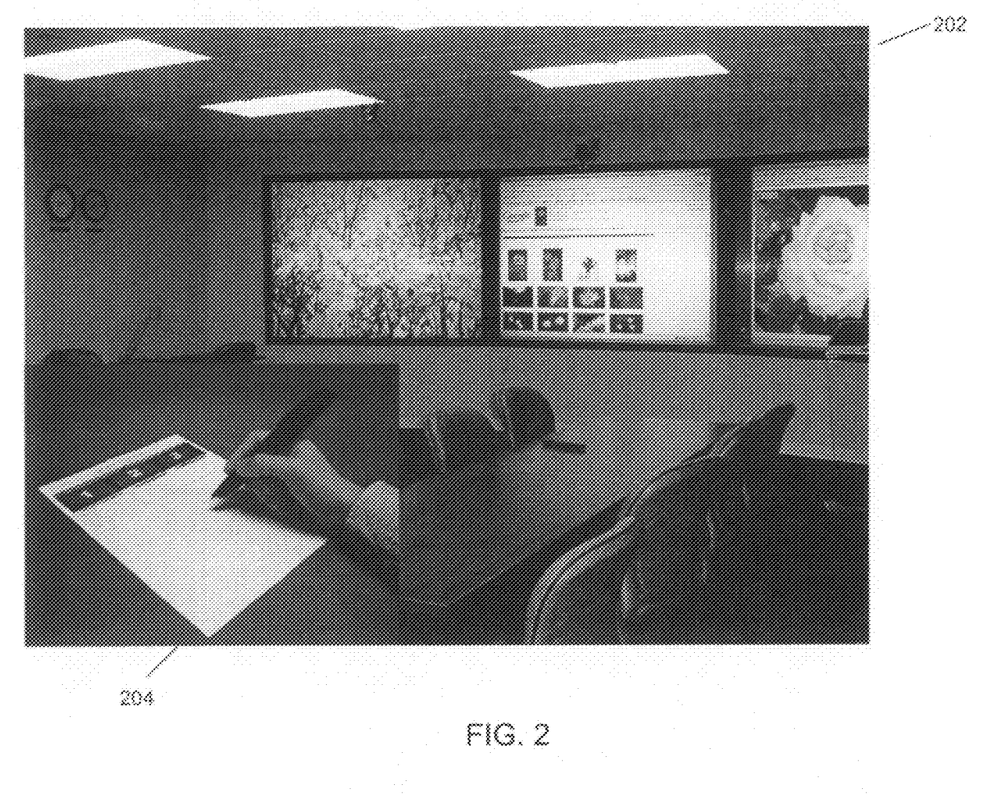
FIG. 2 shows a view of a conference room where a digital pen and a piece of digital paper can be used to control meeting support devices.

FIG. 2 shows one embodiment of the invention deployed in a corporate meeting room 202 with three large public displays. With the digital pen and paper 204, the screens are automatically started when the digital pen is pressed on the piece of paper. A presenter can control presentation progress with the digital pen and paper. A meeting participant can start a white board on any public display to make scribbles. Users can use a digital pen to point or write at any place on a screen for group discussions. They can also initiate an onsite screen printout with a digital pen and paper.

Figure 3:
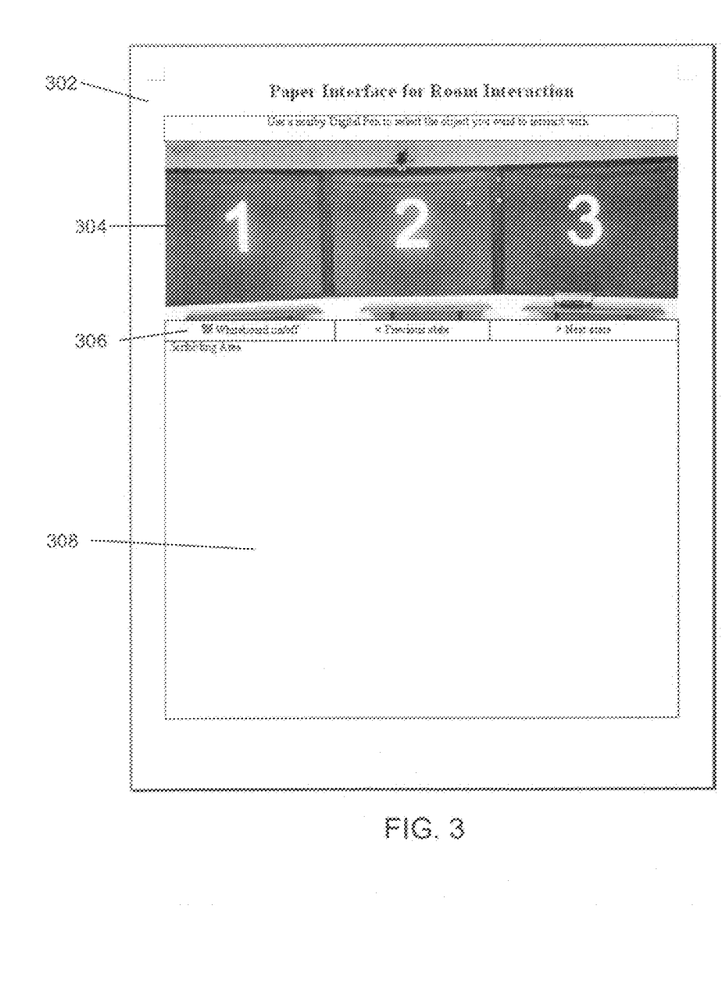
FIG. 3 shows a paper interface for controlling meeting support devices, printed on a piece of digital paper.

FIG. 3 shows one embodiment of the paper interface 302 for controlling meeting support functions. The meeting space adaptation portion 304 can be an image depicting a meeting space, in this embodiment showing the three screens from the meeting room in FIG. 2. By performing drawings in the meeting space adaptation portion using a digital pen, a person can control the information flow among devices in the meeting space. For example, a person can use this meeting space adaptation portion of the paper to select a screen the user wants to draw on by tapping the image of the screen on the paper. In some embodiments, the user can also print out a display by drawing a time-stamped line from a display image to a printer image.

Figure 7:
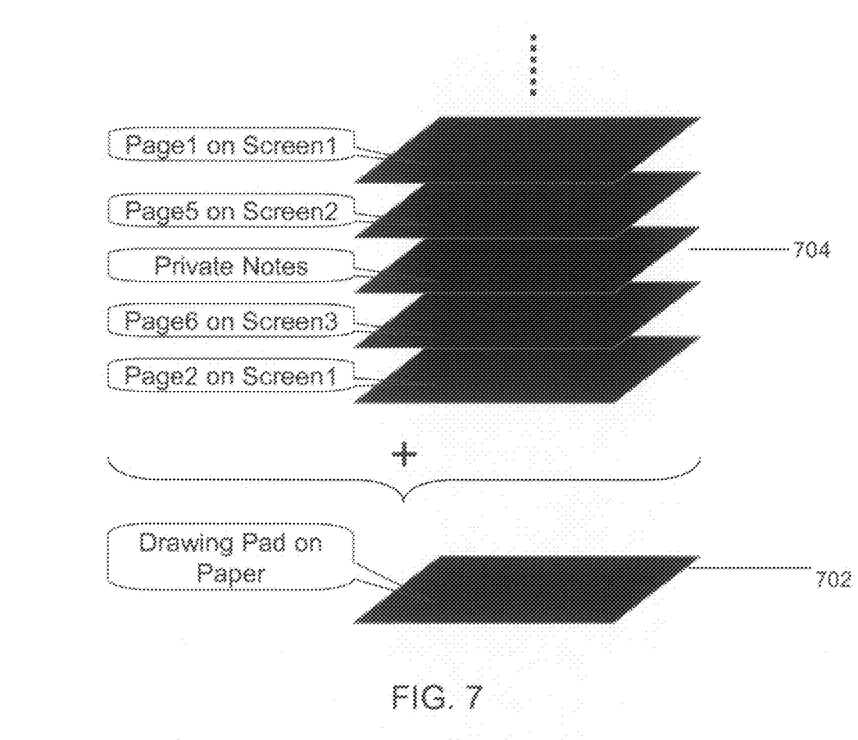
FIG. 7 is an illustration of one piece of digital paper being used as multiple virtual pages.

The freeform drawing pad 308 is a blank space on the digital paper. Depending on the drawings performed in the meeting space adaptation portion, drawings in this portion can be private notes that can only be seen by the paper user, temporary pointing, or a public announcement that can be viewed on a public display tied to this paper. Depending on the time stamp of a stroke and time stamped drawings in the meeting space adaptation portion, drawings on this pad can be separated into multiple public and private layers. FIG. 7 shows how a single piece of digital paper 702 can be used to create and control several virtual screens 704.

The user adaptation portion of the embodiment described in FIG. 3 is a control portion on the freeform drawing pad 308 that is customized for each user. The purpose of this portion is to facilitate the activation of predefined functions. It includes a minimum number of static control buttons 306 and a number of dynamic buttons that users can draw when needed.

Figure 4:
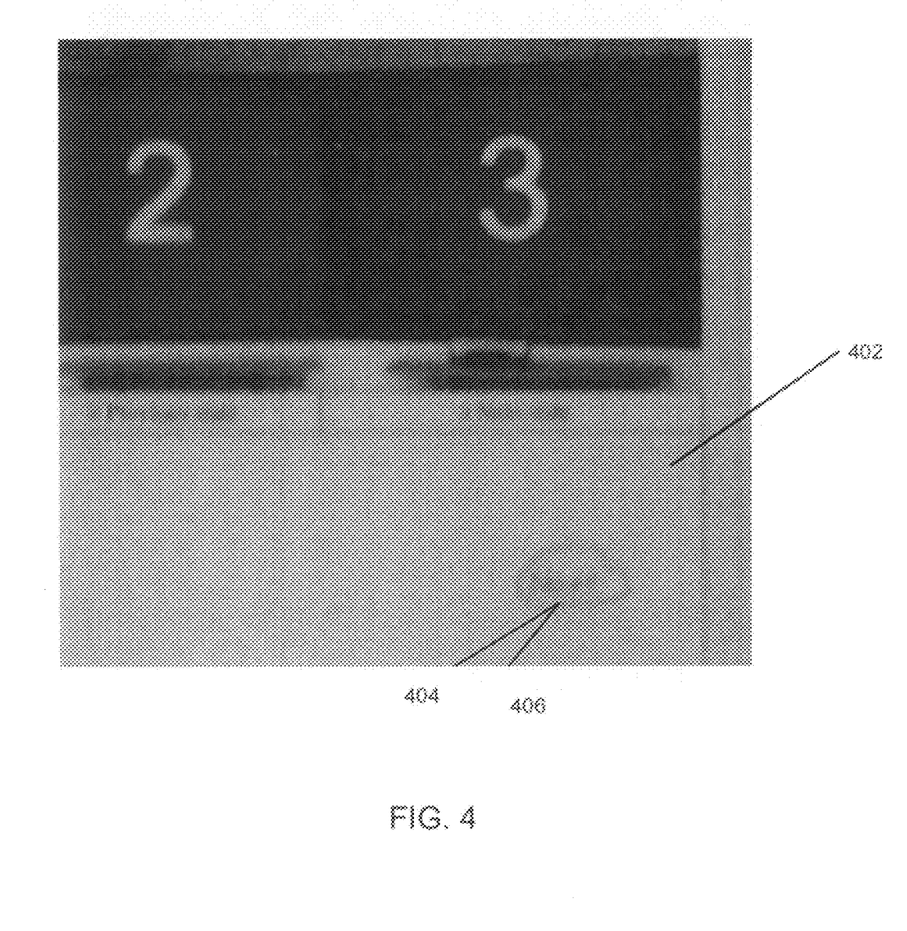
FIG. 4 shows a dynamic button drawn on the piece of digital paper by a user.

The embodiment described in FIG. 4 shows a user adaptation portion 402 with a dynamic button 404 that can be defined by writing a function name 406 surrounded by a continuous closed curve. This is useful for simplifying the interface when the system offers many functions. In some embodiments, all available functions are printed on the reverse side of a digital paper. The reverse side of the digital paper can also have underlying image patterns. Having all available functions printed on the reverse side allows each user to define their own user adaptation portion on the front side of the paper based on the functions on the reverse side. The user can also use the reverse side to issue control commands when the user wants to use a less-frequently used function.

Figure 5:
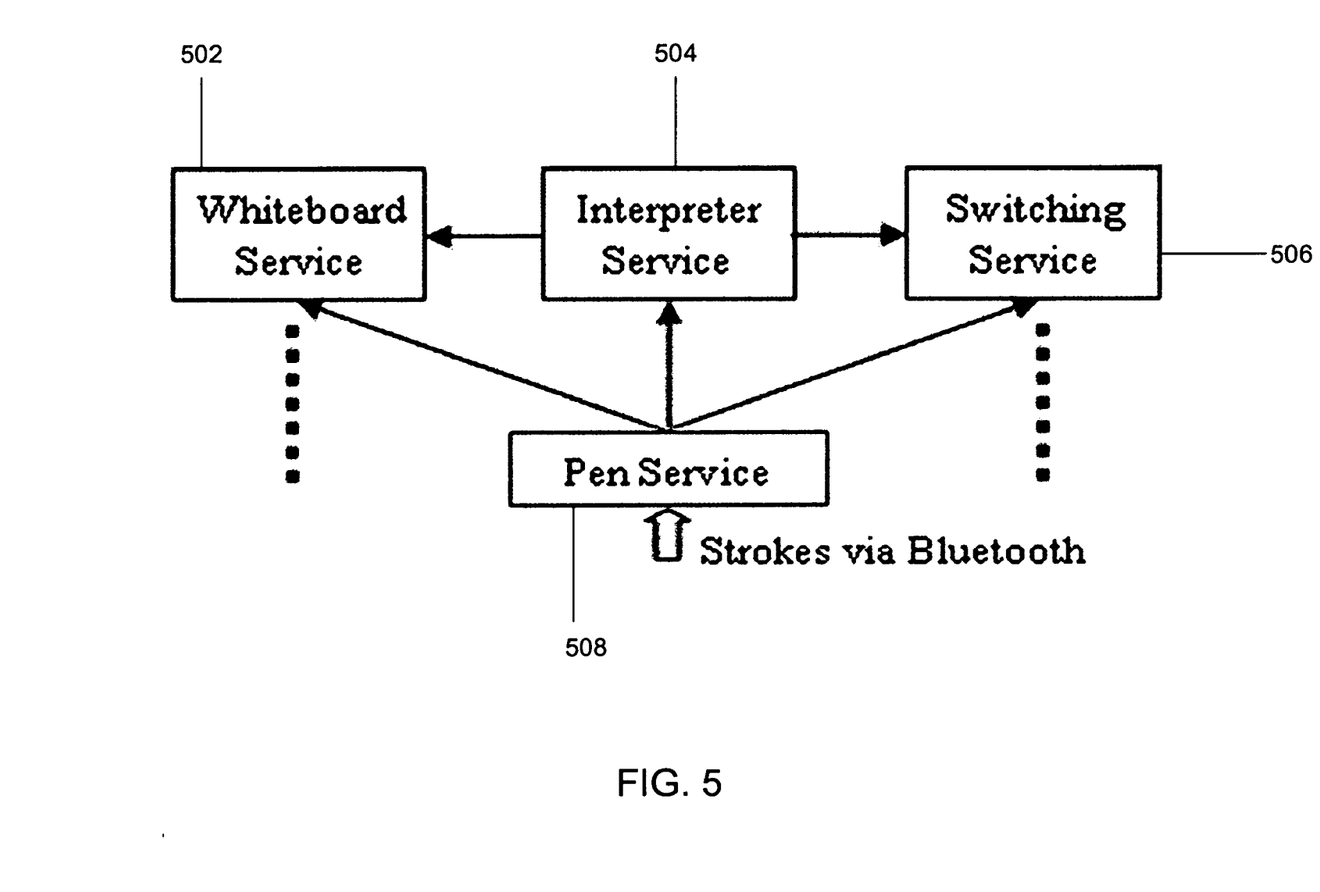
FIG. 5 shows the system architecture for organizing meeting support services with a digital pen.

Some embodiments of the back-end of this system include service-oriented modules that can communicate to each other through service calls. These modules include a pen service 508 for reading strokes from a digital pen, an interpreter service 504 for parsing and interpreting strokes, a whiteboard service 502 for showing public drawings from freeform drawing pads, and a switching service 506 for forming specific screen and computer connections. The relationships between these service modules are illustrated in FIG. 5. Some embodiments include a presentation service for controlling slide shows and a printing service for printer controls.

Figure 6:
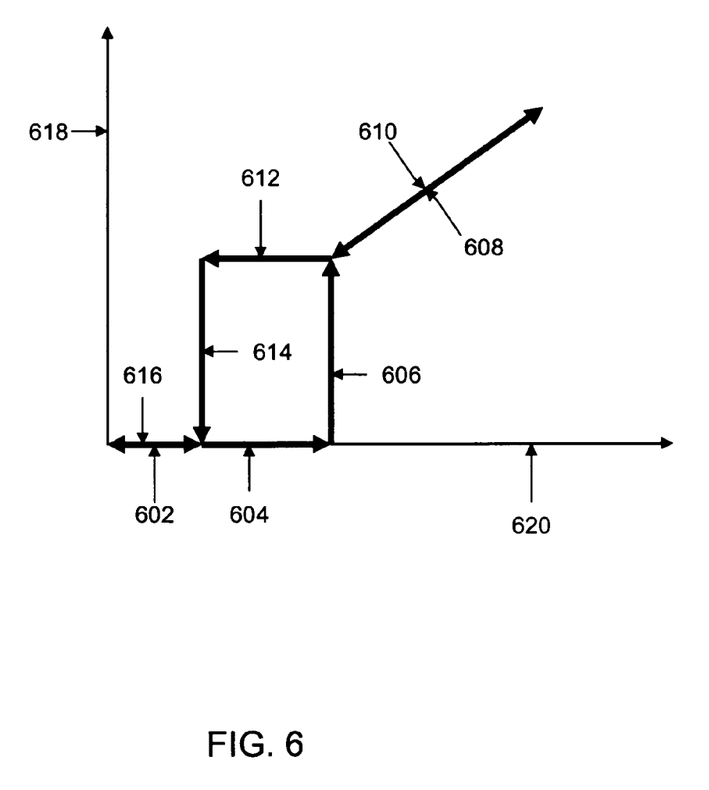
FIG. 6 shows the digital pen pressure activated switching function used for mode transition between pointer mode and visible stroke mode.

After the system front end captures pen strokes, it needs to send these strokes to the back end to initiate proper meeting support functions. The pen service is the part that directly connects to the Digital Pen. For some embodiments, when strokes are written, they are transmitted to the back end through the Bluetooth connection in real time. The pen service monitors the Bluetooth connection. For some embodiments, whenever a (possibly partial) stroke reaches the computer through the Bluetooth connection, the pen service processes it according to the pressure activated function illustrated in FIG. 6. FIG. 6 describes the contrast in Stroke Thickness 618 versus Pen Pressure 620 along a series of eight phases (602-616). By following this curve, the pen acts like a pointer in phases 602 and 604 where the pen pressure is smaller than a certain threshold. When the pressure grows and exceeds an upper threshold in phase 606, each stroke will be assigned a thickness. In phases 608 and 610 where the pen pressure varies above the upper threshold, the stroke thickness is proportional to the pen pressure. When the pressure drops below the upper level, however, the pen still keeps a minimum thickness phase 612, until it reaches the lower threshold at phase 614 and returns to the pointer (zero thickness stroke) mode in phase 616. With this pressure activated function for the pen, a user can use the pen for both pointing and writing on a public display via paper. By applying this Hysteresis curve, visible stroke noise caused by the jittering around a single pressure threshold could be reduced. By using minimum stroke thickness, the storage requirement for unreadable strokes can be eliminated. By using a proportional function at phases 608 and 610 between the stroke thickness and the pen pressure, the pen can be used to draw lines with different thickness. After attaching thickness information to each stroke, the pen service redistributes the stroke to all service subscribers including the interpreter service 504, whiteboard service 502, and switching service 506.

The interpreter service 504 is designed to identify stroke commands from each pen. Strokes received by this service are first processed by a stroke parser. The interpretation process in the stroke parser is based on the starting and ending point of one stroke. If the stroke starts and ends in the meeting space adaptation portion of the paper, the stroke is interpreted as a corresponding command. If a stroke is on the freeform drawing pad, it then goes through a recognizer to test if it matches some predefined drawings or qualifies as part of a dynamic button. More specifically, if the recognizer catches a closed curve among the input strokes, it parses all strokes and tries to recognize those strokes enclosed by the closed curve. If those strokes make a predefined text string, the area enclosed by the curve will be registered into the parser as a new function area, called a dynamic button, which behaves later just like a predefined static button. If the stroke matches a predefined drawing, the stroke is interpreted into commands and sent to corresponding modules. In some embodiments, these commands include slideshow control commands, whiteboard support commands, switching control commands, and printing support commands. Strokes that cannot be matched to predefined commands are treated as freeform notes or a pointer's moving path a user wants to communicate via the paper.

The whiteboard service 502 provides a platform for integrating users' public drawings. It receives strokes from the pen service and renders public drawings according to the pressure activated function illustrated in FIG. 5. Beyond the rendering function, the whiteboard's properties such as visibility and printing destination can also be controlled by commands from the interpreter service.

The switching service 506 is designed to communicate with a hardware switcher that can change connections among meeting support devices. In one embodiment, the switching service is used to turn on screens when one pen is removed from its charging cradle and turn off screens when all pens are set in cradles. In one embodiment, every screen in conference room has multiple computers connected to it and the switching service is also used to select the proper computer to present a show on a screen.

Additional services include the presentation service and printing service. The presentation service performs linear/non-linear slide flips. The printing service prints documents.

Figure 8:
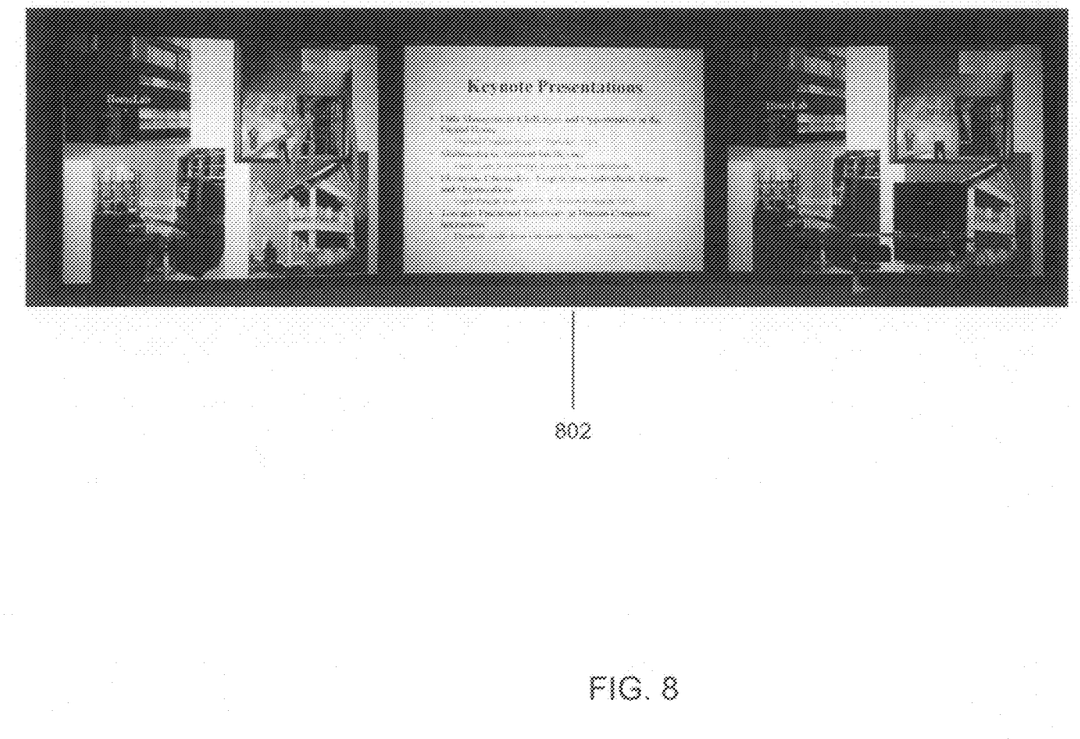
FIG. 8 shows a view of the meeting support devices being controlled by the digital pen and paper for one embodiment.

FIG. 8 shows a view of the meeting support devices 802 being controlled by the digital pen and paper for one embodiment.

Figure 9:
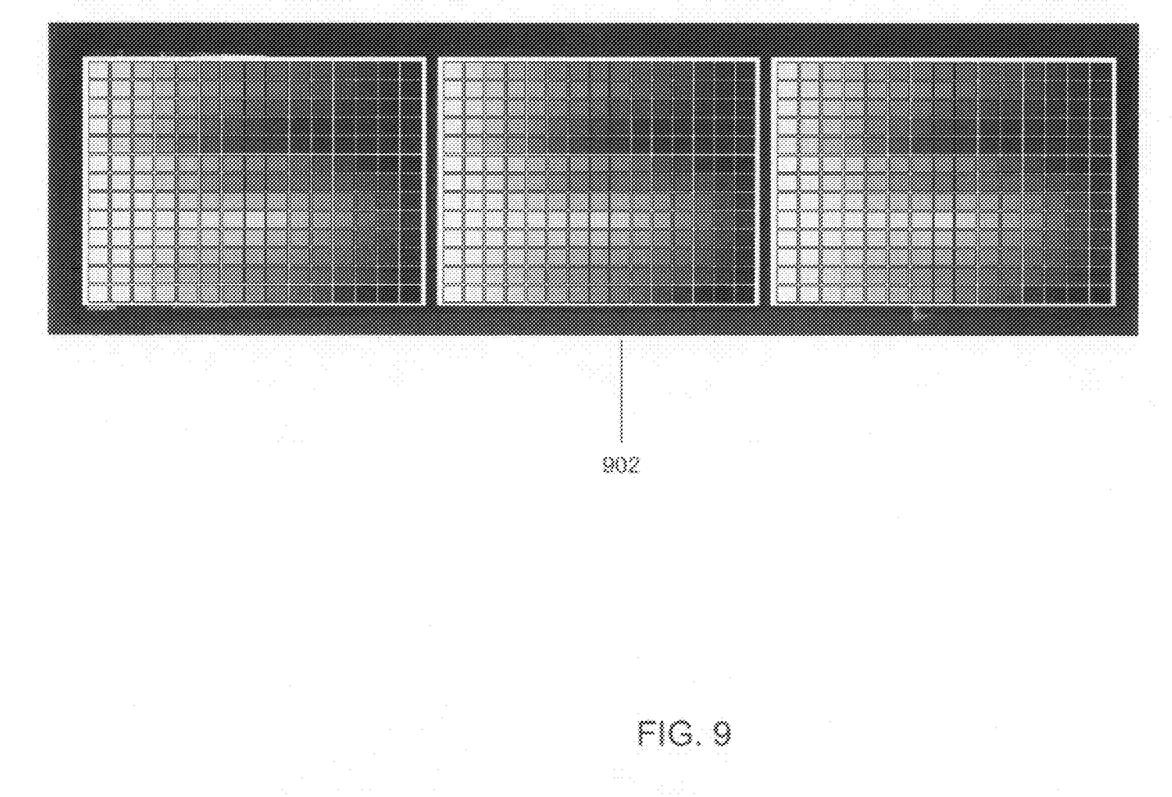
FIG. 9 shows how one embodiment embeds a palette in each display's image of the meeting place adaptation portion so that the display selection and pen color selection can be achieved through one stroke.

FIG. 9 shows how one embodiment can embed a palette 902 in each display's image of the meeting place adaptation portion so that the display selection and pen color selection can be achieved through one stroke.

Figure 10:
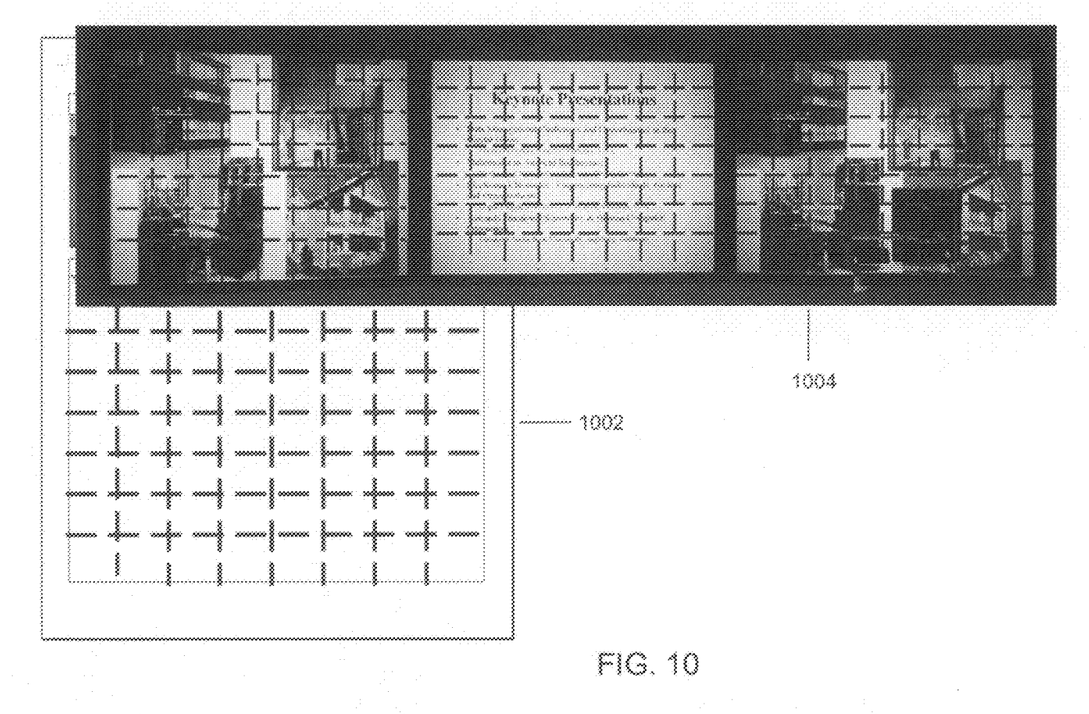
FIG. 10 shows how one embodiment uses associated underlying drawing grids on the freeform pad and each public display to perform pointing, drawings, and annotations.

FIG. 10 describes how one embodiment uses associated underlying drawing grids 1002 on the freeform pad and each public display 1004 to perform pointing, drawings, and annotations.

The authentication into a conference room can be carried out by the digital pen and paper, which is an alternative to ordinary textual passwords. During the registration process, the users are given a specific picture, on which they sign with the digital pen. The x and y coordinates, the shape of the signature, as well as the pressure along each stroke would be recorded for later authentication. With the underlying image, the relation between the signature and the underlying image could serve as extra features for authentication. During the authentication process, the users are given the same picture again, on which they would sign. If the input signature, represented by the x and y coordinates, and the pressure matches with the registered signature well enough, the users are authenticated. In this way, the conference room can also recognize the presenter and brings up his/her slides automatically. The system will continuously monitor the ordinary handwriting on the same paper for further authentication.

As an example of one embodiment, during a meeting, a speaker walks into a meeting room 202, and obtains a copy of the paper interface and a digital pen 204. The screens in the meeting room 802 switch on automatically. After loading a presentation, the speaker taps the buttons on the interface 306 to flip slides during the presentation and drags slides to screens whenever needed. The speaker writes some slide numbers in the freeform sketching area 308 and circles them, making them dynamic buttons 404. Later in the presentation, the speaker taps on those dynamic buttons 404 to return to those slides. The speaker also drags some slides to the printer to print them out 304. On some of the slides, the audiences have questions, during which they use their copies of paper interface to scribble on the slides 308. During Q&A time, the speaker taps on the white board button to start a white board for further discussion 306. After the presentation, each of the audiences keeps one copy of the paper interface 302 for future reference, whereas all the scribbling as well as the operations on the paper interface are already kept in digital form stored by the back end services.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A paper based meeting service management tool for providing meeting support services in a meeting space, comprising:
    a digital paper, wherein:
        the digital paper has an underlying image pattern, and the digital paper includes a freeform drawing portion, a meeting space adaptation portion, and a user adaptation portion; and
    a digital pen, wherein:
        the digital pen can be used to make strokes on the digital paper; and
        the digital pen is configured to transmit the strokes to services that provide meeting support functions such that: a stroke within the meeting space adaptation portion is interpreted as a respective command of a plurality of commands, the respective command corresponding to a respective predefined function of the meeting support functions, wherein the plurality of commands are commands for controlling information flow among devices in the meeting space;
    wherein:
        the user adaptation portion includes a dynamic button created by a user writing a function name associated with a predefined function, and surrounding the function name with a closed curve; and
        when the dynamic button is activated, a command to perform the predefined function associated with the function name is sent to the services that provide meeting support functions.

2. The paper based tool of claim 1, wherein the digital paper includes:
    a user adaptation portion, wherein the user adaptation portion includes a predefined static control button for sending a control command that is one of a plurality of predefined commands to the services that provide meeting support functions.

3. The paper based tool of claim 2, wherein if the stroke starts and ends in the meeting space adaptation portion, the stroke is interpreted as a command.

4. The paper based tool of claim 2, wherein the freeform drawing portion of the digital paper can create multiple virtual public and private drawing layers.

5. The paper based tool of claim 1, wherein available functions for the user adaptation portion are provided on the reverse side of the digital paper.

6. The paper based tool of claim 2, wherein a palette is embedded in an image of the meeting place adaptation portion displayed on a public display located in the meeting space.

7. The paper based tool of claim 2, wherein underlying drawing grids on the freeform portion and a public display located in the meeting space are used to help pointing, drawings, and annotations.

8. The paper based tool of claim 1, wherein the digital pen and the digital paper can authenticate participants in a meeting.

9. The paper based tool of claim 1, wherein the services that provide meeting support functions comprise:
    a pen service for reading strokes from an digital pen;
    an interpreter service for parsing and interpreting strokes;
    a white board service for showing public drawings from the freeform drawing portion;
    a switching service for forming specific screen and computer connections.

10. The paper based tool of claim 9, wherein the services that provide meeting support functions further comprise:
    a presentation service for controlling slide shows; and
    a printing service for printer controls.

11. The paper based tool of claim 10, wherein the strokes are transmitted from the digital pen to the pen service through a Bluetooth connection.

12. The paper based tool of claim 9 wherein the digital pen has a pressure-activated switching function for mode transition between pointer mode and visible stroke mode.

13. The system of claim 1, wherein the services that provide meeting support functions comprise:
    a pen service for reading strokes from a digital pen, wherein the strokes are transmitted from the digital pen to the pen service through a Bluetooth connection;
    an interpreter service for parsing and interpreting strokes, wherein the interpreter service parses the strokes and identifies stroke commands;
    a white board service for showing public drawings from the freeform drawing portion;
    a switching service for forming specific screen and computer connections;
    a presentation service for controlling slide shows; and
    a printing service for printer controls.

14. A computer-implemented method for providing meeting services for a meeting space comprising:
    at a computer including a processor and memory:
        receiving, from a digital pen, information indicative of a stroke on a digital paper, wherein the digital paper has an underlying image pattern, the digital paper including a freeform drawing portion and a meeting space adaptation portion;
        determining that the stroke is within the meeting space adaptation portion;
        interpreting the stroke as a respective command of a plurality of commands, wherein the respective command corresponds to a respective predefined function of the meeting support functions;
        performing the respective predefined function, wherein the respective predefined function controls information flow among devices in the meeting space;

receiving, from the digital pen, information indicative of activation of a dynamic button, wherein the dynamic button was created by a user writing a function name of a predefined function and surrounding the function name with a closed curve; and performing the predefined function indicated by the dynamic button.

15. The paper based tool of claim 1, wherein the respective command is selected from the list consisting of: a slideshow control command, a whiteboard support command, a switching control command, and a printing support command.

16. A paper-based meeting service management tool, comprising:

a digital paper that includes a freeform drawing portion and a meeting space adaptation portion for controlling information flow among devices in the meeting space, wherein the devices include a plurality of public displays, wherein the meeting space adaptation portion includes a plurality of regions, each associated with a different respective one of the plurality of public displays responsive to meeting support services; and a digital pen that is configured to interact with the digital paper and to communicate to the meeting support services stroke information pertaining to its interactions with the digital paper;

wherein the meeting support services are configured, in response to selection with the digital pen of a particular one of the regions, to render on the public display associated with the particular region images that correspond to at least a subset of the stroke information arising from interactions between the digital pen and the freeform drawing portion.

17. The paper-based meeting service management tool of claim 16, wherein at least a portion of the digital paper includes an underlying image pattern that is interpretable by the digital pen to locate itself on the digital paper.

18. The paper-based meeting service management tool of claim 16, wherein the regions comprise indications on the meeting space adaptation portion corresponding to the public displays, the indications being arranged on the meeting space adaptation portion in correspondence to relative locations of the public displays in a meeting room.

19. The paper-based meeting service management tool of claim 18, wherein the indication comprises at least one of: an icon or a text description.

20. A digital paper interface for controlling meeting support functions, comprising:

a digital paper with a meeting space adaptation portion having a plurality of regions, each of the regions being associated with a different respective device of a plurality of devices in a meeting space that can be controlled via computer-implemented meeting support services;

wherein the digital paper is usable with a digital pen that is configured to communicate to the meeting support services stroke information pertaining to its interactions with the digital paper; and wherein the meeting support services are configured to control information flow among the devices based on the stroke information communicated by the digital pen pertaining to the respective regions.

21. The digital paper interface of claim 20, wherein:
the devices include public displays; and
the regions include indications on the meeting space adaptation portion corresponding to the public displays, the indications being arranged on the meeting space adaptation portion in correspondence to relative locations of the public displays in the meeting space.

22. The paper-based meeting service management tool of claim 16, wherein:

the digital paper includes a user adaptation portion including a dynamic button created by a user writing a function name associated with a predefined function, and surrounding the function name with a closed curve; and the paper-based meeting service management tool is configured to cause a command to perform the predefined function associated with the function name to be sent to the services that provide meeting support functions in response to activation of the dynamic button.

23. The digital paper interface of claim 20, wherein:
the digital paper includes a user adaptation portion including a dynamic button created by a user writing a function name associated with a predefined function, and surrounding the function name with a closed curve; and the digital paper interface is configured to cause a command to perform the predefined function associated with the function name to be sent to the services that provide meeting support functions in response to activation of the dynamic button.

24. A computer-implemented method for providing meeting support functions for a meeting space comprising:

at a computer including a processor and memory:
receiving, from a digital pen, information indicative of a plurality of strokes on a digital paper, wherein the digital paper has an underlying image pattern;

determining that a respective stroke of the plurality of strokes is a closed curve enclosing an enclosed area on the digital paper;

analyzing one or more other strokes, of the plurality of strokes, that are within the enclosed area;

determining that the one or more other strokes within the enclosed area correspond to a predefined text string that is associated with a predefined function; and registering the enclosed area as a dynamic button for the predefined function, wherein when the dynamic button is activated, a command to perform the predefined function is sent to services that provide meeting support functions.

25. A computer system for providing meeting support functions for a meeting space comprising:

one or more processors;
memory; and
one or more programs, wherein the one or more programs are stored in the memory and configured to be executed by the one or more processors, the one or more programs including instructions for:

receiving, from a digital pen, information indicative of a plurality of strokes on a digital paper, wherein the digital paper has an underlying image pattern;

determining that a respective stroke of the plurality of strokes is a closed curve enclosing an enclosed area on the digital paper;

analyzing one or more other strokes, of the plurality of strokes, that are within the enclosed area;

determining that the one or more other strokes within the enclosed area correspond to a predefined text string that is associated with a predefined function; and registering the enclosed area as a dynamic button for the predefined function, wherein when the dynamic button is activated, a command to perform the predefined function is sent to services that provide meeting support functions.

* * * * *